United States Patent
Munagapati

(10) Patent No.: US 12,114,155 B2
(45) Date of Patent: Oct. 8, 2024

(54) METHOD AND APPARATUS FOR NON-LINEAR AUTHENTICATION OF VEHICLE COMMUNICATIONS

(71) Applicant: GM GLOBAL TECHNOLOGY OPERATIONS LLC, Detroit, MI (US)

(72) Inventor: Suresh Munagapati, Cumming, GA (US)

(73) Assignee: GM Global Technology Operations LLC, Detroit, MI (US)

( * ) Notice: Subject to any disclaimer, the term of this patent is extended or adjusted under 35 U.S.C. 154(b) by 367 days.

(21) Appl. No.: 17/750,510

(22) Filed: May 23, 2022

(65) Prior Publication Data

US 2023/0413043 A1     Dec. 21, 2023

(51) Int. Cl.
    *H04W 12/06*            (2021.01)
    *H04L 9/40*              (2022.01)
    *H04W 4/40*             (2018.01)
    *H04W 12/041*         (2021.01)

(52) U.S. Cl.
    CPC ........... *H04W 12/06* (2013.01); *H04L 63/068* (2013.01); *H04W 4/40* (2018.02); *H04W 12/041* (2021.01)

(58) Field of Classification Search
None
See application file for complete search history.

(56) References Cited

U.S. PATENT DOCUMENTS

| | | | |
|---|---|---|---|
| 2002/0007454 A1* | 1/2002 | Tarpenning | G06Q 10/10 705/51 |
| 2009/0015373 A1* | 1/2009 | Kelly | B60R 25/24 340/5.62 |
| 2012/0303943 A1* | 11/2012 | Tamura | G06F 21/6218 713/2 |
| 2015/0343993 A1* | 12/2015 | Ferrieres | B60R 25/04 701/2 |
| 2016/0035146 A1* | 2/2016 | Knight | G07C 5/006 701/29.1 |
| 2019/0109718 A1* | 4/2019 | Nowottnick | H04L 9/3278 |
| 2020/0029213 A1* | 1/2020 | Nölscher | B60R 25/24 |
| 2024/0034269 A1 | 2/2024 | Munagapati | |

* cited by examiner

*Primary Examiner* — William J. Goodchild
(74) *Attorney, Agent, or Firm* — Quinn IP Law

(57) ABSTRACT

A system for authenticating communications from a vehicle to a remote assistance unit includes a connectivity module (CM) installed in the vehicle. A security device is adapted to transmit messages when the security device is within a predefined proximity of the CM. A security cloud unit is configured to validate the security device based in part on a first pair of complementary keys, including a first factory key stored by the security device and a second factory key stored by the security cloud unit. The first pair of complementary keys is configured for asymmetric encryption such that the first factory key is solely decryptable with the second factory key. The remote assistance unit is configured to authenticate an integrity of the CM based in part on a second pair of complementary keys which are dynamically generated by the security cloud unit.

18 Claims, 2 Drawing Sheets

METHOD AND APPARATUS FOR NON-LINEAR AUTHENTICATION OF VEHICLE COMMUNICATIONS

INTRODUCTION

The present disclosure relates generally to a system and corresponding method for authenticating communications from a vehicle to a remote assistance unit. It is an undeniable facet of modern life that many people spend a considerable amount of time in their vehicles while being transported from one place to another. Many vehicles are equipped with communication methods or technologies that enable an occupant of the vehicle to communicate with various remote entities. Such communications may be subject to hacking or compromise due to various sources of risks. Authentication of communications from the vehicle may be a matter of particular concern when the vehicle is traversing unfavorable or hostile territories.

SUMMARY

Disclosed herein is a system for authenticating communications from a vehicle to a remote assistance unit. The system includes a connectivity module (CM) installed in the vehicle. A security device is adapted to transmit messages when the security device is within a predefined proximity of the CM. A security cloud unit is configured to validate the security device based in part on a first pair of complementary keys, including a first factory key stored by the security device and a second factory key stored by the security cloud unit. The first pair of complementary keys is configured for asymmetric encryption such that the first factory key is solely decryptable with the second factory key. The remote assistance unit is configured to authenticate an integrity of the CM based in part on a second pair of complementary keys which are dynamically generated by the security cloud unit. The remote assistance unit may be a vehicle services cloud unit.

In one embodiment, the security device is devised as a handheld FOB. Validating the security device may include configuring the security device to send an activation request for the CM, including submitting an encrypted message over a first network to the security cloud unit using the first factory key. The security cloud unit is adapted to decrypt the encrypted message from the security device using the second factory key.

The second pair of complementary keys is dynamically generated by the security cloud unit with a predefined expiration time. The second pair of complementary keys is not stored (e.g., on a physical medium or an electronic medium), thereby eliminating a fixed repository of credentials and eliminating the possibility of theft. The second pair of complementary keys includes a first transaction key and a second transaction key, the security cloud being adapted to transmit the first transaction key to the security device. The security device may be configured to transmit the first transaction key to the CM by proximity detection. The CM is adapted to contact the remote assistance unit using the first transaction key. The security cloud unit may be configured to transmit the second transaction key to the remote assistance unit through a second network.

The CM is adapted to submit a data request to the remote assistance unit for authentication using a plural origin of credential submission mechanism whereby the first transaction key is submitted by the CM to the remote assistance unit and the second transaction key is submitted by the security cloud unit to the remote assistance unit, both parts being correlated by the remote assistance unit to authenticate the data request.

The remote assistance unit is adapted to authenticate the integrity of the CM based on the second transaction key transmitted by the security cloud unit. The CM may be adapted to submit a data request to the remote assistance unit over a third network, the data request being accepted when the integrity of the CM is successfully authenticated. The first network, the second network and the third network are out-of-band respectively with one another, the first network, the second network and the third network each including multiple respective modes. In one embodiment, the data request to the remote assistance unit from the CM incorporates password salting recognizable by a user of the vehicle. The password salting may be dynamically generated based in part on a mission of the vehicle and payload data.

Disclosed herein is a method of authenticating communications from a vehicle to a remote assistance unit. The method includes installing a connectivity module (CM) in the vehicle and configuring a security device to transmit messages when the security device is within a predefined proximity of the CM. A first pair of complementary keys is generated, including a first factory key stored by the security device and a second factory key stored by a security cloud unit. The first pair of complementary keys is configured for asymmetric encryption such that the first factory key is solely decryptable with the second factory key. The method includes validating the security device via the security cloud unit, based in part on the first pair of complementary keys. The method further includes authenticating an integrity of the CM, via the remote assistance unit, based in part on a second pair of complementary keys dynamically generated by the security cloud unit.

The above features and advantages and other features and advantages of the present disclosure are readily apparent from the following detailed description of the best modes for carrying out the disclosure when taken in connection with the accompanying drawings.

Figure 1:
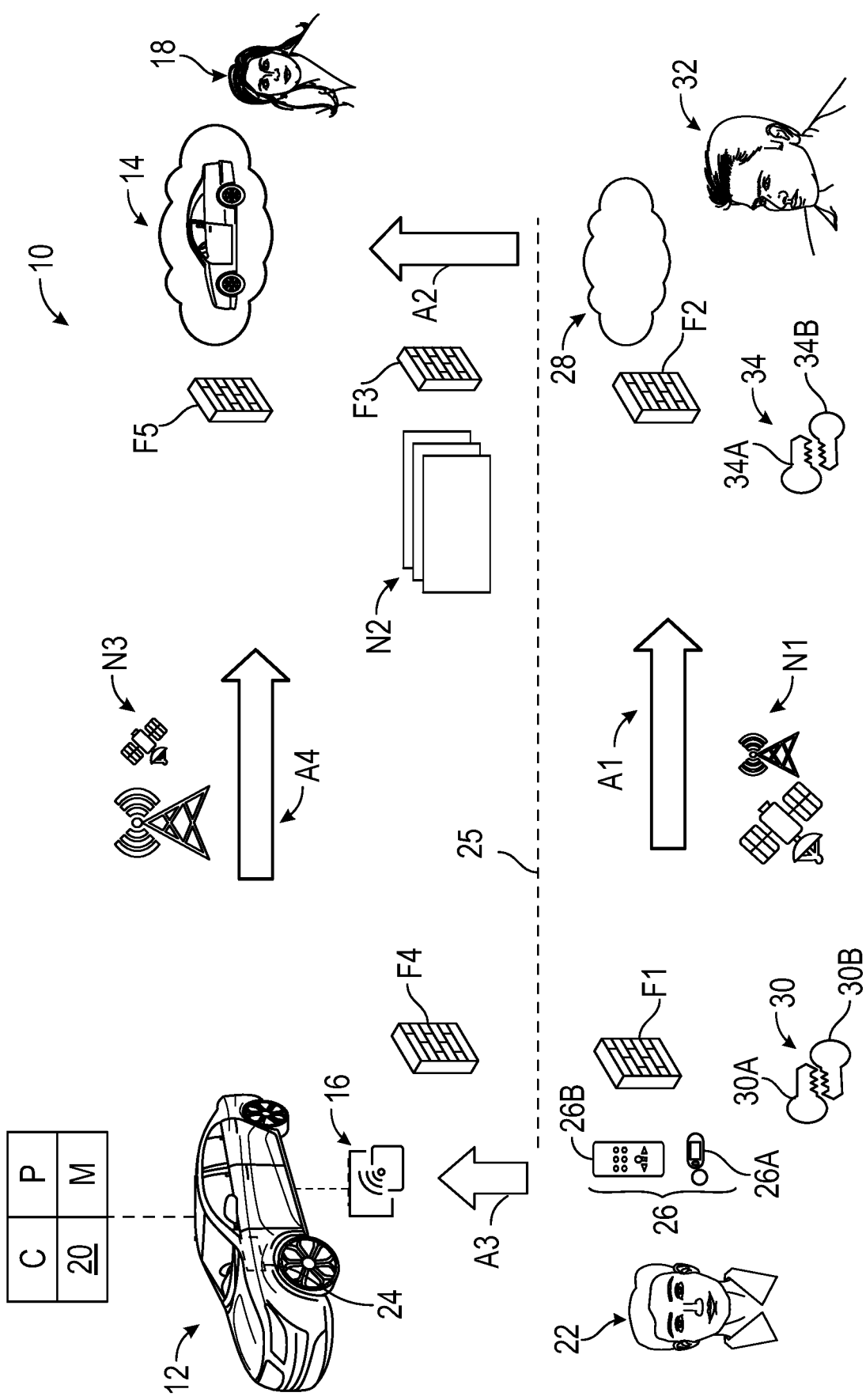
FIG. 1 is a schematic fragmentary diagram of a system with a non-linear authentication mode.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for authenticating communications from a vehicle 12 to a remote assistance unit 14. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components.

Referring to FIG. 1, the vehicle 12 is equipped with a connectivity module 16, referred to hereinafter as "CM 16." The CM 16 is adapted to contact the remote assistance unit 14 with various requests. The remote assistance unit 14 may be a cloud unit dedicated to vehicle services. In one embodiment, the remote assistance unit 14 is a vehicle services cloud SaaS (Software-as-a-Service) application. The remote assistance unit 14 may be manned electronically and/or by a remote advisor 18 (e.g., service administrator) having access to an electronic device such as a desktop computer, laptop, tablet, cell phone or wearable device. The remote assistance unit 14 may include one or more servers hosted on the Internet to store, manage, and process data. The remote assistance unit 14 may be a private or public entity maintained by an organization, such as for example, a public agency, a research institute or a company.

Referring to FIG. 1, the system 10 implements a non-linear authentication mode 20 for communications between the CM 16 and the remote assistance unit 14, including validating the identity of a user 22 of the vehicle 12. The user 22 may be a driver or a passenger of the vehicle 12. A flowchart of a method 100 of operating the non-linear authentication mode 20 is shown in and described below with respect to FIG. 2. In some embodiments, the non-linear authentication mode 20 may be automatically activated when the vehicle 12 is in operation. Alternatively, the non-linear authentication mode 20 may be selectively activated based on a request from the user 22, for example, through a user interface 24 in the vehicle 12. The user interface 24 may include a touchscreen or other IO device and may be incorporated in the dashboard, overhead visor (not shown), or other suitable location in the vehicle 12.

The system 10 enables the vehicle 12 to traverse unfavorable or hostile territories while providing protection from compromise due to various sources of risks. Security is enhanced via dynamic network and role segregation, schematically represented by segmentation line 25. A non-linear authentication process is created by generating credentials at runtime and splitting the credentials into multiple sources for submission to be correlated. The technical advantage here is that a single point of origin for submission of credentials is eliminated. Another advantage is that the credentials are not stored on a physical representation such as disk, database, hard drive etc. and thus cannot be stolen.

Referring to FIG. 1, the system 10 further includes a security device 26. The security device 26 is adapted to transmit messages when the security device 26 is in proximity to or within a predefined distance of the CM 16. In one embodiment, the security device 26 is fashioned or devised as a handheld FOB 26A. In another embodiment, the security device 26 is fashioned as a handheld mobile device 26B.

As described below, the security device 26 is validated based in part on a first pair 30 of complementary keys. Referring to FIG. 1, the first pair 30 of complementary keys includes a first factory key 30A stored by the security device 26 and a second factory key 30B stored by a security cloud unit 28. The first pair 30 of complementary keys provides asymmetric encryption such that the first factory key 30A is solely decryptable with the second factory key 30B. The security device 26 requests activation of the CM 16 by the security cloud unit 28 by submitting an encrypted message securely using the first factory key 30A that is decrypted using the second factory key 30B (complementary key).

Referring to FIG. 1, various types of mechanisms (e.g., firewall F1, F2, F3, F4 and F5) that block unauthorized access, while permitting outward communication, may be positioned at several interfaces in the system 10. The security cloud unit 28 of FIG. 1 may be manned electronically and/or by a security administrator 32 having access to an electronic device such as a desktop computer, laptop, tablet, cell phone or wearable device. The security cloud unit 28 may include one or more servers hosted on the Internet to store, manage, and process data.

Also as described below, the remote assistance unit 14 is adapted to authenticate an integrity of the CM 16 based in part on a second pair 34 of complementary keys which are dynamically generated by the security cloud unit 28. When the integrity of the CM 16 is successfully authenticated, the data request from the vehicle 12 (via the CM 16) is accepted by the remote assistance unit 14. It is understood that the first pair 30 and second pair 34 of complementary keys are not physical keys, but rather electronic codes or transmissions or messages of various sizes in relation to data sensitivity and/or network trustworthiness.

Figure 2:
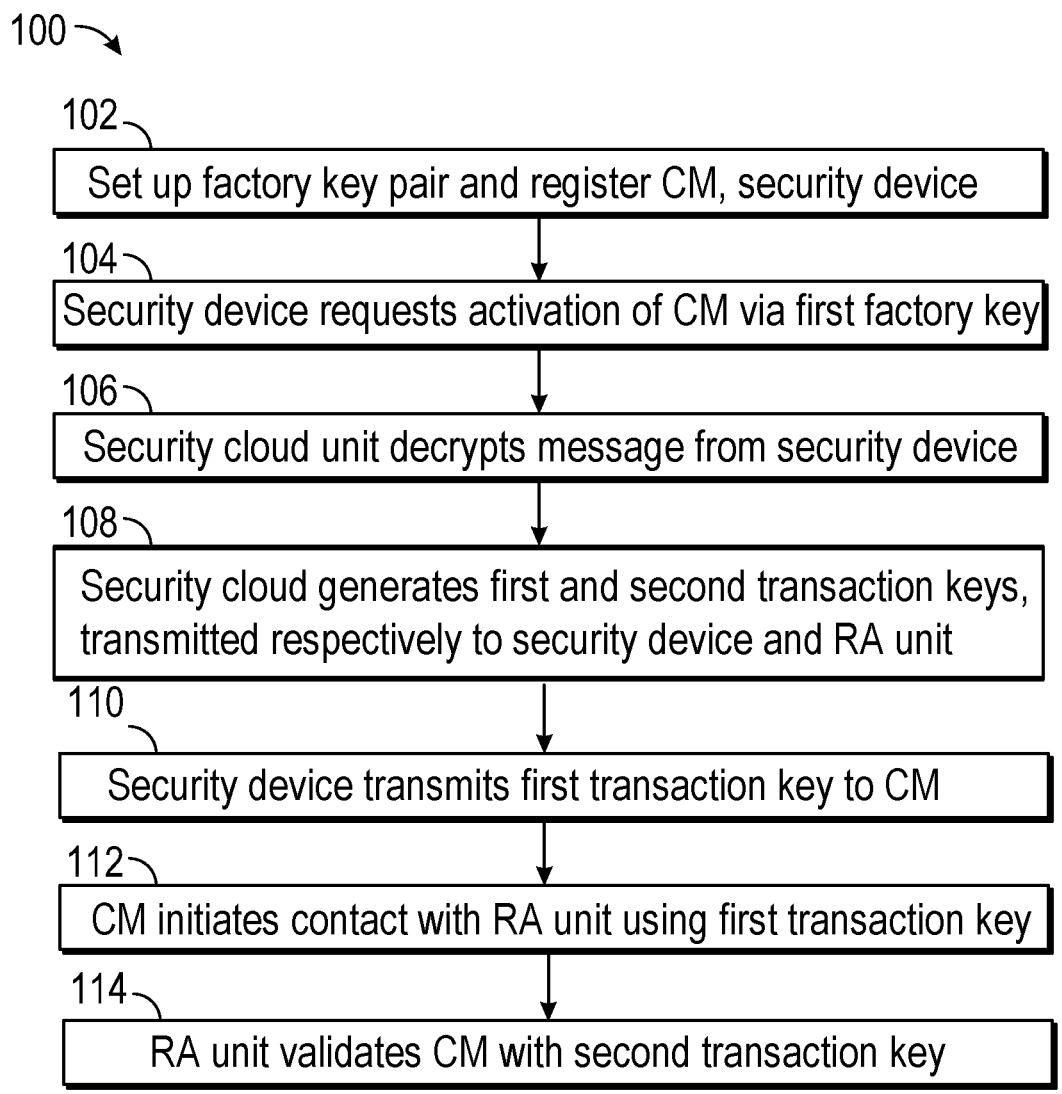
FIG. 2 is a flowchart for an example method of operating the non-linear authentication mode of FIG. 1.

Referring now to FIG. 2, a flowchart of a method 100 of operating the non-linear authentication mode 20 is shown. Method 100 need not be applied in the specific order recited herein. Furthermore, it is to be understood that some blocks may be eliminated. Method may be executed in real-time, continuously, systematically, sporadically and/or at regular intervals during normal and ongoing operation of the vehicle 12.

In some embodiments, method 100 may be embodied as computer-readable code or stored instructions and may be at least partially executable by a controller C. Referring to FIG. 1, the vehicle 12 includes the controller C with at least one processor P and at least one memory M (or non-transitory, tangible computer readable storage medium). The memory M can store controller-executable instruction sets, and the processor P can execute the controller-executable instruction sets stored in the memory M. The security device 26, security cloud unit 28, remote assistance unit 14 and CM 16 may include respective processors and respective tangible, non-transitory memory on which instructions are recorded for at least partially executing method 100.

Beginning at block 102 of FIG. 2, the method 100 includes setting up the first pair 30 of complementary keys. This may be done by the manufacturer at the factory or by the vehicle distributor prior to the vehicle 12 being released for sale or use. In other words, the first pair 30 of complementary keys ("factory keys") are generated prior to the vehicle 12 venturing out on a mission or trip. The first pair 30 includes a first factory key 30A that is stored by the security device 26 and a second factory key 30B that is stored by the security cloud unit 28. The first pair 30 of complementary keys are configured for asymmetric encryption, such that the first factory key 30A is solely decryptable with the second factory key 30B.

Block 102 includes registration of the security device 26 and the CM 16 in the remote assistance unit 14 and/or the security cloud unit 28. For example, the security administrator 32 may assist in registering the CM 16 and security device 26 with the security cloud unit 28 at the start of the process. The remote advisor 18 may assist in registering the CM 16 and security device 26 with the remote assistance unit 14 at the start of the process.

Advancing to block 104 of FIG. 2, the security device 26 is configured to send an activation request for the CM 16, by submitting an encrypted message (as indicated by arrow A1 in FIG. 1) over a first network N1 to the security cloud unit 28 using the first factory key 30A. The first network N1 may be dynamically selected based on the mission of the vehicle 12 and data classification. Each event may be logged by the security device 26.

Proceeding to block 106 of FIG. 2, the security cloud unit 28 receives the messages, holds the connection and validates the integrity of the security device 26. The security device 26 is validated when the security cloud unit 28 decrypts the encrypted message from the security device 26 using the second factory key 30B, and other conditions are fulfilled. For example, the security cloud unit 28 may determine as to whether the security device 26 appears healthy and un-tampered with. If the security device 26 appears unhealthy or tampered, the security cloud unit 28 may alert various personnel, disable the connection and follow other recovery protocols. In another embodiment, validation of the security device 26 includes verification of the current geographic location of the vehicle 12 in relation to the activity or purpose or mission that the vehicle 12 is tasked with. Each event may be logged by the security cloud unit 28.

Proceeding to block 108 of FIG. 2, assuming successful validation, the security cloud unit 28 generates a second pair 34 of complementary keys for transaction authentication. The second pair 34 of complementary keys is not stored (e.g., on a physical medium or an electronic medium), thereby eliminating a fixed repository of credentials and eliminating the possibility of theft. Referring to FIG. 1, the second pair 34 includes a first transaction key 34A and a second transaction key 34B. The second pair 34 of complementary keys may be dynamically generated by the security cloud unit 28 with a finite time to live prior to expiration. In other words, if the authentication does not occur with the predefined expiration time, the second pair 34 of complementary keys will no longer work. The first transaction key 34A is transmitted to the security device 26 (optionally with a predefined expiration time). The security cloud unit 28 may then close the connection with the security device 26.

Referring to FIG. 1, the security cloud unit 28 injects the second transaction key 34B to the remote assistance unit 14 (as shown by arrow A2 in FIG. 1) through a second network N2. The second network N2 is selected based on various factors (e.g., mission classification) without repeating previous networks.

Advancing to block 110 of FIG. 2, as indicated by arrow A3 in FIG. 1, the security device 26 is configured to forward the first transaction key 34A (that it received from the security cloud unit 28 in block 108) to the CM 16 by proximity detection. In other words, the CM 16 is able to access the particulars of the first transaction key 34A if the security device 26 is within a predefined distance of the CM 16.

Advancing to block 112 of FIG. 2, as indicated by arrow A4 in FIG. 1, the CM 16 initiates a secure communication with the remote assistance unit 14 using the first transaction key 34A (that it obtained access to in block 110), along with a data request over a third network N3. The CM 16 selects a different network band/route (third network N3) without repeating the previous network connections (first and second networks N1, N2) in submitting the data request to the remote assistance unit 14 (referred as "RA unit" in FIG. 2).

Referring to FIG. 1, the first network N1, the second network N2 and the third network N3 are each different wireless networks which are out-of-band respectively with one another. The first network N1, the second network N2 and the third network N3 may be short-range or long-range networks. The first network N1, the second network N2 and the third network N3 may include a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The networks may include a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. It is understood that other types of network and satellite technologies or communication protocols available to those skilled in the art may be employed.

The first network N1, the second network N2 and the third network N3 may each incorporate multiple respective modes of transmission, including both satellite and non-satellite methods. For example, the first network N1 may include a first satellite mode and a first local area network. The second network N2 may include a second satellite mode and a second local area network. The third network N2 may include a third satellite mode and a third local area network. Here the first, second and third satellite modes are different from one another, and the first, second and third local area networks are also different from one another.

The data request to the remote assistance unit 14 from the CM 16 may incorporate dynamically generated "password salting" that is recognizable by the user 22 of the vehicle 12. Password salting may be defined as a technique to fortify passwords by adding complexity, e.g., by adding a string (e.g., having 32 or more characters) and then hashing them. As understood by those skilled in the art, hashing is the process of converting an input of various length into a fixed size string (or a number) using an algorithm. Password salting prevents hackers from reverse-engineering codes/passwords. The password salting may be dynamically generated based in part on the mission of the vehicle 12 and payload data. For example, the "salt" added may be a personal question related to the user 22, such as their mother's maiden name, their first-grade teacher or a keyword related to the mission of the vehicle 12. The password salting may be registered with the remote assistance unit 14, through the remote advisor 18.

Proceeding to block 114 of FIG. 2, the remote assistance unit 14 authenticates the integrity of the CM 16 based on the second transaction key 34B (and password salting, if present) that had been transmitted to it by the security cloud unit 28. In other words, the remote assistance unit 14 validates the status of the CM 16 by correlating or decrypting the first transaction key 34A with the second transaction key 34B, as well as determining if the password salting incorporated in it (if present) matches. The remote assistance unit 14 may further inquire as to whether the CM 16 appears healthy and un-tampered. If the CM 16 appears unhealthy or tampered, the remote assistance unit 14 may alert various personnel, disable the connection and follow other recovery protocols. In one embodiment, authentication of the CM 16 includes verification of the current geographic location of the vehicle 12 in relation to the activity or purpose or mission that the vehicle 12 is tasked with. On successful authentication, the remote assistance unit 14 accepts the data requests and issue commands or tasks, as appropriate.

The data request by the CM 16 may include the secure transfer of data collected by various sensors (not shown) on the vehicle 12 and ambience to the remote assistance unit 14. In one example, this may include transfer of current fuel level and/or the fuel consumption rate, for the remote assistance unit 14 to calculate the effective mileage range. In another example, this may include transfer of current engine oil levels to be processed by the remote assistance unit 14 to calculate predictive maintenance.

The data request by the CM 16 may include retrieval of a task or command (or an alert) from the remote assistance unit 14 based on the data analysis to be executed in the vehicle 12 or processed by others. For example, this may include an alert/notification to the user 22 on the remaining fuel range or a need to get the vehicle 12 serviced. The data request by the CM 16 may include the secure transfer of complex data sets such as images, audio and video streams for complex analysis and predictive outcomes. For example, this may include operator behavior-monitoring to improve human-system interactions, spotting visually undetectable objects or conditions and supporting augmented reality modeling and outcome modeling.

In summary, an effective and secure way of authenticating communications from a vehicle 12 is presented. The system 10 provides protection from external threats and insider risks by eliminating static trust store and providing plural origin authentication keys. A second pair 34 of complementary keys is dynamically generated at runtime to secure the transaction for the security device 26 and CM 16 (that have been registered with a first pair 30 of complementary keys), with no single individual controlling the process. As described above, the system 10 enables dynamic generation and validation of credentials, with multiple sources for originating the credentials.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file system, an application database in a proprietary format, a relational database energy management system (RDBMS), directory servers, etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for authenticating communications from a vehicle to a remote assistance unit, the system comprising:
   a connectivity module (CM) installed in the vehicle;
   a security device adapted to transmit messages when the security device is within a predefined proximity of the CM;
   a security cloud unit configured to validate the security device based in part on a first pair of complementary keys, including a first factory key stored by the security device and a second factory key stored by the security cloud unit;

wherein the first pair of complementary keys is configured for asymmetric encryption such that the first factory key is solely decryptable with the second factory key;

wherein the remote assistance unit is configured to authenticate an integrity of the CM based in part on a second pair of complementary keys dynamically generated by the security cloud unit, the second pair of complementary keys being dynamically generated by the security cloud unit with a predefined expiration time; and wherein the second pair of complementary keys is not stored, thereby eliminating a fixed repository of credentials.

2. The system of claim 1, wherein the security device is a handheld FOB and the remote assistance unit is a vehicle services cloud unit.

3. The system of claim 1, wherein:
the second pair of complementary keys includes a first transaction key and a second transaction key; and
the CM is adapted to submit a data request to the remote assistance unit for authentication using a plural origin of credential submission mechanism whereby the first transaction key is submitted by the CM to the remote assistance unit and the second transaction key is submitted by the security cloud unit to the remote assistance unit, both being correlated by the remote assistance unit to authenticate the data request by the CM.

4. The system of claim 1, wherein validating the security device includes configuring the security device to send an activation request for the CM, including submitting an encrypted message over a first network to the security cloud unit using the first factory key, the security cloud unit being adapted to decrypt the encrypted message from the security device using the second factory key.

5. The system of claim 4, wherein:
the second pair of complementary keys includes a first transaction key and a second transaction key, the security cloud being adapted to transmit the first transaction key to the security device;
the security device is configured to transmit the first transaction key to the CM by proximity detection, the CM being adapted to contact the remote assistance unit using the first transaction key;
the security cloud unit is configured to transmit the second transaction key to the remote assistance unit through a second network; and
the remote assistance unit is adapted to authenticate the integrity of the CM based on the second transaction key transmitted by the security cloud unit.

6. The system of claim 5, wherein the CM is adapted to submit a data request to the remote assistance unit over a third network, the data request being accepted when the integrity of the CM is successfully authenticated.

7. The system of claim 6, wherein the first network, the second network and the third network are out-of-band respectively with one another, the first network, the second network and the third network each including multiple respective modes.

8. The system of claim 6, wherein the data request to the remote assistance unit from the CM incorporates password salting recognizable by a user of the vehicle.

9. The system of claim 8, wherein the password salting is dynamically generated based in part on a mission of the vehicle and payload data.

10. A method of authenticating communications from a vehicle to a remote assistance unit, the method comprising:
installing a connectivity module (CM) in the vehicle;
configuring a security device to transmit messages when the security device is within a predefined proximity of the CM;
generating a first pair of complementary keys, including a first factory key stored by the security device and a second factory key stored by a security cloud unit, the first pair being configured for asymmetric encryption such that the first factory key is solely decryptable with the second factory key;
validating the security device via the security cloud unit, based in part on the first pair of complementary keys;
authenticating an integrity of the CM via the remote assistance unit based in part on a second pair of complementary keys dynamically generated by the security cloud unit;
submitting a data request by the CM to the remote assistance unit, the second pair of complementary keys including a first transaction key and a second transaction key; and
authenticating the data request using a plural origin of credential submission mechanism whereby the first transaction key is submitted by the CM to the remote assistance unit and the second transaction key is submitted by the security cloud unit to the remote assistance unit, both being correlated by the remote assistance unit to authenticate the data request by the CM.

11. The method of claim 10, further comprising:
generating the second pair of complementary keys via the security cloud unit with a predefined expiration time, the second pair of complementary keys; and
eliminating a fixed repository of credentials by not storing the second pair of complementary keys.

12. The method of claim 11, wherein validating the security device includes:
adapting the security device to send an activation request for the CM, including submitting an encrypted message over a first network using the first factory key; and
configuring the security cloud unit to receive the activation request and decrypt the encrypted message from the security device using the second factory key possessed by the security cloud unit.

13. The method of claim 12, wherein authenticating the integrity of the CM includes:
configuring the security cloud unit to transmit a first transaction key to the security device, the second pair of complementary keys including the first transaction key and a second transaction key;
transmitting the first transaction key from the security device to the CM by proximity detection, the CM being adapted to contact the remote assistance unit using the first transaction key;
transmitting the second transaction key from the security cloud unit to the remote assistance unit through a second network; and
authenticating the integrity of the CM, via the remote assistance unit, based on the second transaction key transmitted by the security cloud unit.

14. The method of claim 13, further comprising:
submitting a data request from the CM to the remote assistance unit on a third network; and
configuring the remote assistance unit to accept the data request when the integrity of the CM is successfully authenticated.

15. The method of claim 14, further comprising:
selecting the first network, the second network and the third network to be out-of-band respectively with one another, the first network, the second network and the third network each including multiple respective modes.

16. The method of claim 14, further comprising:
incorporating password salting in the data request from the CM to the remote assistance unit, the password salting being recognizable by a user of the vehicle.

17. The method of claim 16, further comprising:
generating dynamically the password salting based in part on a mission of the vehicle and payload data.

18. A system for authenticating communications from a vehicle to a remote assistance unit, the system comprising:
a connectivity module (CM) installed in the vehicle;
a security device adapted to transmit messages when the security device is within a predefined proximity of the CM;
a security cloud unit configured to validate the security device based in part on a first pair of complementary keys, including a first factory key stored by the security device and a second factory key stored by the security cloud unit;
wherein the first pair of complementary keys is configured for asymmetric encryption such that the first factory key is solely decryptable with the second factory key;
wherein the remote assistance unit is configured to authenticate an integrity of the CM based in part on a second pair of complementary keys, the second pair being dynamically generated by the security cloud unit with a predefined expiration time;
wherein the CM is adapted to submit a data request to the remote assistance unit, the data request being accepted when the integrity of the CM is successfully authenticated; and
wherein the data request to the remote assistance unit from the CM incorporates password salting recognizable by a user of the vehicle.

* * * * *